US012065943B2

(12) United States Patent
Zheng et al.

(10) Patent No.: US 12,065,943 B2
(45) Date of Patent: Aug. 20, 2024

(54) MORPHABLE ROTOR BLADES AND TURBINE ENGINE SYSTEMS INCLUDING THE SAME

(71) Applicant: General Electric Company, Schenectady, NY (US)

(72) Inventors: Li Zheng, Latham, NY (US); Nicholas Joseph Kray, Mason, OH (US); Scott Roger Finn, Montgomery, OH (US)

(73) Assignee: General Electric Company, Cincinnati, OH (US)

( * ) Notice: Subject to any disclaimer, the term of this patent is extended or adjusted under 35 U.S.C. 154(b) by 225 days.

(21) Appl. No.: 17/533,566

(22) Filed: Nov. 23, 2021

(65) Prior Publication Data

US 2023/0160307 A1 May 25, 2023

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F05D 2300/505* (2013.01); *F05D 2300/603* (2013.01)

(58) Field of Classification Search
CPC ..... F01D 5/282; F01D 5/147; F05D 2300/505
See application file for complete search history.

(56) References Cited

U.S. PATENT DOCUMENTS

| | | | | |
|---|---|---|---|---|
| 6,699,015 | B2 * | 3/2004 | Villhard | F01D 5/16 416/500 |
| 7,384,240 | B2 * | 6/2008 | McMillan | F01D 5/147 416/131 |
| 8,142,165 | B2 | 3/2012 | Beckford et al. | |
| 8,202,056 | B2 | 6/2012 | Rice | |
| 8,366,057 | B2 * | 2/2013 | Vos | B64C 3/50 244/214 |
| 8,657,561 | B2 * | 2/2014 | Buffone | B64C 3/48 415/12 |
| 8,944,365 | B2 | 2/2015 | Groen | |
| 9,120,554 | B2 * | 9/2015 | Shome | B64C 3/48 |
| 9,133,714 | B2 * | 9/2015 | Vontell | F01D 5/147 |
| 10,352,173 | B2 * | 7/2019 | Prince | B29D 99/0025 |
| 10,654,557 | B2 | 5/2020 | Xi et al. | |
| 10,830,067 | B2 | 11/2020 | Kray et al. | |
| 10,830,102 | B2 | 11/2020 | Martin et al. | |
| 11,046,415 | B1 | 6/2021 | Pankonien et al. | |
| 2006/0018761 | A1 | 1/2006 | Webster et al. | |
| 2009/0208342 | A1 * | 8/2009 | Mons | F01D 5/28 29/889.7 |
| 2013/0287588 | A1 | 10/2013 | Shim et al. | |
| 2016/0138419 | A1 * | 5/2016 | Kray | F01D 25/02 415/208.1 |

* cited by examiner

*Primary Examiner* — Michael L Sehn
(74) *Attorney, Agent, or Firm* — Dority & Manning, P.A.

(57) ABSTRACT

Morphable rotor blades for a turbine engine systems include a root portion and an airfoil portion having a morphable portion including a morphable material that changes shape in response to a stimulus.

17 Claims, 9 Drawing Sheets

MORPHABLE ROTOR BLADES AND TURBINE ENGINE SYSTEMS INCLUDING THE SAME

FIELD

The present subject matter relates generally to components of a turbine engine systems, or, more particularly, to rotor blades, such as fan blades, including a morphable portion such that a shape of the rotor blades change.

BACKGROUND

A turbomachine is a device that generally transfers energy between a rotor and a fluid. One type of turbomachine is a gas turbine engine, which generally includes a fan section and a core engine arranged in flow communication with one another. Additionally, the core engine of the gas turbine engine generally includes, in serial flow order, a compressor section, a combustion section, a turbine section, and an exhaust section. In operation, air is provided from the fan section to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

One type of gas turbine engine, a turbofan engine, operates on the principle that a central gas turbine core drives a bypass fan section, the fan section being located at a radial location between a nacelle of the engine and the engine core. Rotation of the fan blades creates an airflow through the inlet to the core engine, as well as an airflow over the core engine. Another type of gas turbine engine, an open rotor engine, instead operates on the principle of having the bypass fan section located outside of the engine nacelle. This generally permits the use of larger fan blades able to act upon a larger volume of air than for a turbofan engine, and thereby improves propulsive efficiency over conventional engine designs.

Such fan blade assemblies generally include fan blades having root portions which are connected to a rotor such that the rotor rotates in response to gases being directed toward the fan blades. Typically, an airfoil used in such fan blades has a shape designed to yield optimum performance at a single operating or flight cycle point, which may be highly inefficient at other design points of importance. For example, such a blade design may be more efficient at one rotating speed relative to another.

Improvements to the rotor blades of turbomachines, such as fan blades of gas turbine engine systems, would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
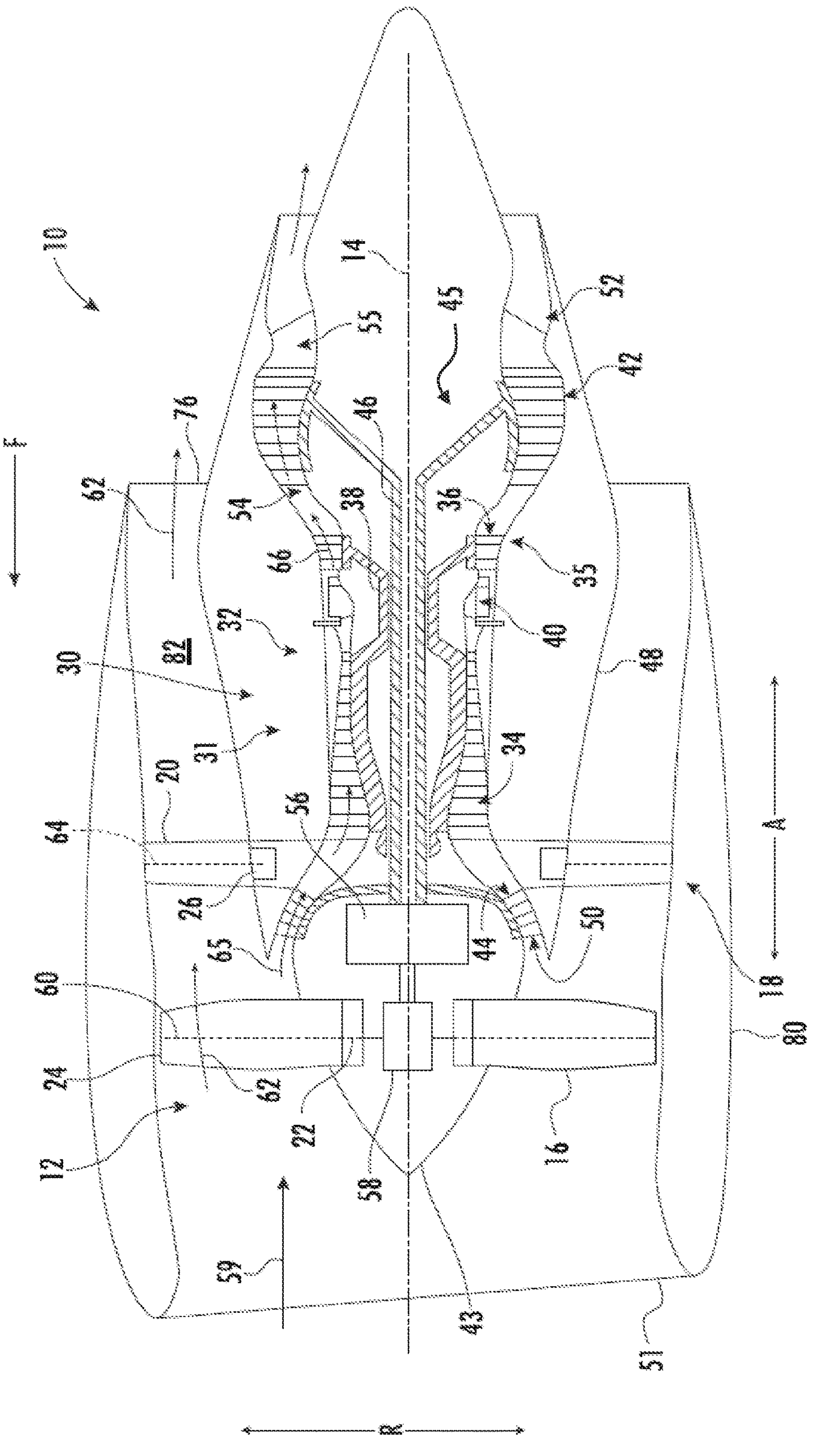
FIG. 1 is a schematic, cross-sectional view of an exemplary, ducted gas turbine engine system according to various embodiments of the present subject matter.

Repeat use of reference characters in the present specification and drawings is intended to represent the same or analogous features or elements of the present subject matter.

DETAILED DESCRIPTION OF THE INVENTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a turbomachine, gas turbine engine, or vehicle and refer to the normal operational attitude of the same. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain aspects of the present disclosure, a morphable rotor blade for a turbine engine system is provided. The rotor blade generally includes a root portion and an airfoil portion. The airfoil portion includes a morphable portion having a lattice structure including a morphable material, such as a shape memory alloy or a piezoelectric material. As such, the morphable portion is configured to change shape, relative to a non-morphable remainder of the airfoil portion.

The change of the shape of morphable portion relative to the remainder portion allows for the airfoil shape to be adjusted at various operating cycle points, thereby potentially increasing the aerodynamic efficiency of the morphable rotor blade and/or an associated rotor assembly, which in turn can lower the specific fuel consumption of the turbine engine. For example, such a rotor blade may be configured to change shape in response to a takeoff condition driven stimulus of a gas turbine engine (e.g., a rotation speed, temperature, or the like) and/or in response to a cruise condition of a gas turbine engine. Thus, the present disclosure may provide for passive control of the shape of a rotor blade, such as the shape of the morphable portion positioned near the trailing edge and/or tip of the blade. In various other aspects of the disclosure, morphable rotor blades may include active control to alter the shape of the morphable portion, e.g., temperature control using heating elements, heat exchangers, or the like or via application of a current to the morphable material.

Referring now to the Drawings, FIG. 1 shows an elevational, cross-sectional view of an exemplary embodiment of a gas turbine engine as may incorporate one or more inventive aspects of the present disclosure. The exemplary gas turbine engine of FIG. 1 is a configured as a single rotor, ducted turbine engine system 10 defining an axial direction A, a radial direction R, and a circumferential direction (extending about the axial direction A). As is seen from FIG. 1, turbine engine system 10 takes the form of a closed rotor propulsion system and has a rotor assembly 12 (e.g., a fan section) which includes a plurality of airfoils arranged around a central longitudinal axis 14 of turbine engine system 10, and more particularly includes a plurality of rotor blades 16 arranged around the central longitudinal axis 14 of turbine engine system 10. Moreover, as will be explained in more detail below, the turbine engine system 10 additionally includes a fixed or stationary outlet guide vane assembly 18 positioned aft of the rotor assembly 12 (i.e., non-rotating with respect to the central longitudinal axis 14), which includes a plurality of airfoils also disposed around central longitudinal axis 14, and more particularly includes a plurality of vanes 20 (e.g., outlet guide vanes) disposed around central longitudinal axis 14.

The rotor blades 16 are arranged in typically equally spaced relation around the central longitudinal axis 14, and each blade has a root 22 and a tip 24 and a span defined therebetween. Similarly, the outlet guide vanes 20 are also arranged in typically equally spaced relation around the central longitudinal axis 14, and each has a root and a tip and a span defined therebetween. The rotor assembly 12 further includes a hub 43 located forward of the plurality of rotor blades 16.

Additionally, the turbine engine system 10 includes a turbomachine core engine 30, which, in the exemplary embodiment, includes a low speed system 31 and a high speed system 32. The high speed system 32 of the core engine 30 generally includes a high speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air and providing a flow of combustion gasses through the high speed turbine 36 for driving the high speed spool 35.

The low speed system 31 similarly includes a low speed turbine 42, a low speed compressor 44 (or booster), and a low speed shaft 46 extending between and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the turbine engine system 10.

Although the turbine engine system 10 is depicted with the low speed compressor 44 positioned forward of the high speed compressor 34, in certain embodiments the compressors 34, 44 may be in an interdigitated arrangement. Additionally, or alternatively, although the turbine engine system

10 is depicted with the high speed turbine 36 positioned forward of the low speed turbine 42, in certain embodiments the turbines 36, 42 may similarly be in an interdigitated arrangement.

Referring still to FIG. 1, the core engine 30 may be encased in a cowl 48. Moreover, it will be appreciated that the cowl 48 defines at least in part an inlet 50 and a jet exhaust nozzle section 52 and includes a core flowpath 54 extending between the inlet 50 and the jet exhaust nozzle section 52. The inlet 50 is for the embodiment shown an annular or axisymmetric 360 degree inlet 50 located between the rotor assembly 12 and the fixed or stationary outlet guide vane assembly 18 and provides a path for incoming atmospheric air to enter the core flowpath 54 (and compressors 44, 34, combustion section 40, and turbines 36, 42) inwardly of the outlet guide vanes 20 along the radial direction R. Such a location may be advantageous for a variety of reasons, including management of icing performance as well as protecting the inlet 50 from various objects and materials as may be encountered in operation. However, in other embodiments, the inlet 50 may be positioned at any other suitable location, e.g., aft of the vane assembly 18, arranged in a non-axisymmetric manner, etc.

As briefly mentioned above, the turbine engine system 10 includes a vane assembly 18. The vane assembly 18 extends from the cowl 48 and is positioned aft of the rotor assembly 12. The outlet guide vanes 20 of the vane assembly 18 may be mounted to a stationary frame or other mounting structure and do not rotate relative to the central longitudinal axis 14. For reference purposes, FIG. 1 also depicts the forward direction with arrow F, which in turn defines the forward and aft portions of the system. As shown in FIG. 1, the rotor assembly 12 is located forward of the core engine 30 in a "puller" configuration, and the jet exhaust nozzle section 52 is located aft of the outlet guide vanes 20. As will be appreciated, the outlet guide vanes 20 of the vane assembly 18 may be configured for straightening out an airflow (e.g., reducing a swirl in the airflow) from the rotor assembly 12 to increase an efficiency of the turbine engine system 10. For example, the outlet guide vanes 20 may be sized, shaped, and configured to impart a counteracting swirl to the airflow from the rotor blades 16 so that in a downstream direction aft of both rows of airfoils (e.g., rotor blades 16, outlet guide vanes 20) the airflow has a greatly reduced degree of swirl, which may translate to an increased level of induced efficiency. Furthermore, outlet guide vanes 20 may support one or more of core engine 30, the cowl 48, or a nacelle 80 (described presently) relative to one another, a frame or other fixed structure of the turbine engine system 10, or an associated foundation, vehicle, or the like.

Referring still to FIG. 1, the rotor blades 16, the outlet guide vanes 20, or both, may incorporate a pitch change mechanism such that the airfoils (e.g., rotor blades 16, outlet guide vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature, which may be useful in certain operating conditions, such as upon landing an aircraft, or to desirably adjust acoustic noise produced at least in part by the rotor blades 16, the outlet guide vanes 20, or aerodynamic interactions from the rotor blades 16 relative to the outlet guide vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 26 for rotating the outlet guide vanes 20 about their respective pitch axes 64.

As is depicted, the rotor assembly 12 is driven by the core engine 30, and more specifically, is driven by the low speed spool 45. More specifically, the turbine engine system 10 in the embodiment shown in FIG. 1 includes a power gearbox 56, and the rotor assembly 12 is driven by the low speed spool 45 of the core engine 30 across the power gearbox 56. The power gearbox 56 may include a gearset for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the central longitudinal axis 14 and generate thrust to propel turbine engine system 10, and hence an aircraft to which it is associated, in a forward direction F. As further shown in FIG. 1, the exemplary turbine engine system 10 includes a nacelle 80 circumferentially surrounding at least in part the rotor assembly 12 and core engine 30, defining a bypass airflow passage 82 therebetween.

During operation of the ducted turbine engine system 10, a volume of air 59 enters the turbine engine system 10 through an associated inlet 51 of the nacelle 80 and/or rotor assembly 12. As the volume of air 59 passes across the rotor blades 16, a first portion of the air 59 as indicated by arrows 62 is directed or routed into the bypass airflow passage 82, and a second portion of the air 59 as indicated by arrow 65 is directed or routed into the core flowpath 54, or more specifically into the low speed compressor 44. The ratio between the first portion of air 62 and the second portion of air 65 is commonly known as a bypass ratio. The pressure of the second portion of air 65 is then increased as it is routed through the high speed compressor 34 and into the combustion section 40, where it is mixed with fuel and burned to provide combustion gases 66.

The combustion gases 66 are routed through the high speed turbine 36 where a portion of thermal and/or kinetic energy from the combustion gases 66 is extracted via sequential stages of high speed turbine stator vanes and high speed turbine rotor blades that are coupled to the high speed spool 35, thus causing the high speed spool 35 to rotate, thereby supporting operation of the high speed compressor 34. The combustion gases 66 are then routed through the low speed turbine 42 where a second portion of thermal and kinetic energy is extracted from the combustion gases 66 via sequential stages of low pressure turbine stator vanes and low speed turbine rotor blades that are coupled to the low speed spool 45, thus causing the low speed spool 45 to rotate, thereby supporting operation of the low speed compressor 44 and/or rotation of the rotor assembly 12.

The combustion gases 66 are subsequently routed through the jet exhaust nozzle section 52 of the core engine 30 to provide propulsive thrust. Simultaneously, the pressure of the first portion of air 62 is substantially increased as the first portion of air 62 is routed through the bypass airflow passage 82 before it is exhausted from a nozzle exhaust section 76 of the ducted turbine engine system 10, also providing propulsive thrust. The high speed turbine 36, the low speed turbine 42, and the jet exhaust nozzle section 52 at least partially define a hot gas path 55 for routing the combustion gases 66 through the core engine 30.

It should be appreciated, however, that the exemplary, single rotor, ducted engine depicted in FIG. 1 is by way of example only, and that in other exemplary embodiments, the turbine engine system 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be an unducted engine, a turbofan engine, a turboshaft engine, a turboprop engine, turbojet engine, etc.

Figure 4:
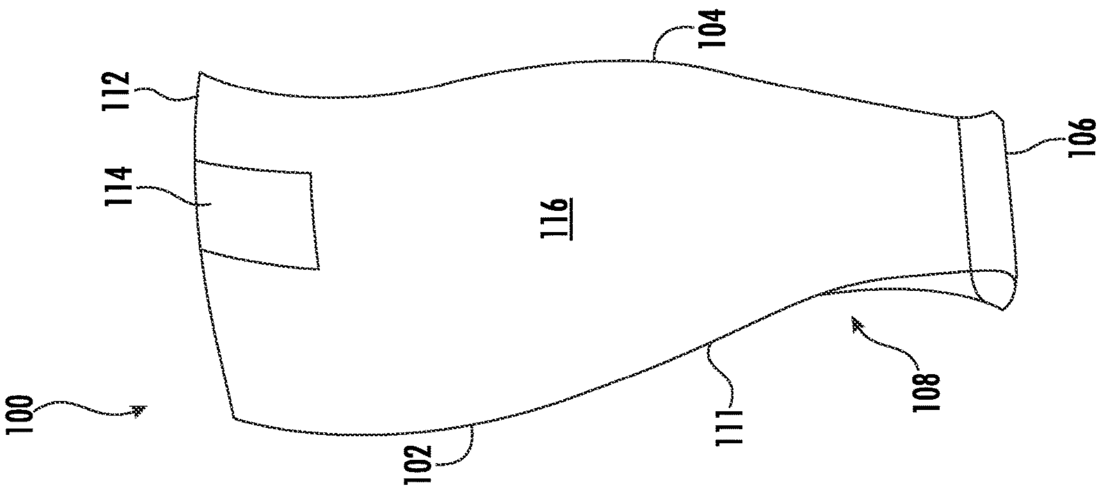
FIG. 4 is a schematic, pictorial view of a morphable rotor blade in accordance with another exemplary aspect of the present disclosure.
Figure 3:
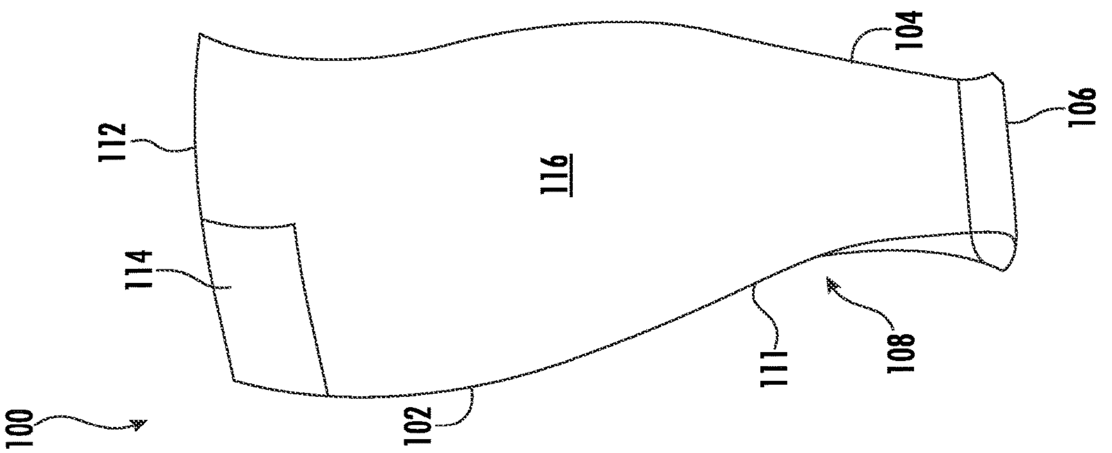
FIG. 3 is a schematic, pictorial view of a morphable rotor blade in accordance with another exemplary aspect of the present disclosure.
Figure 2:
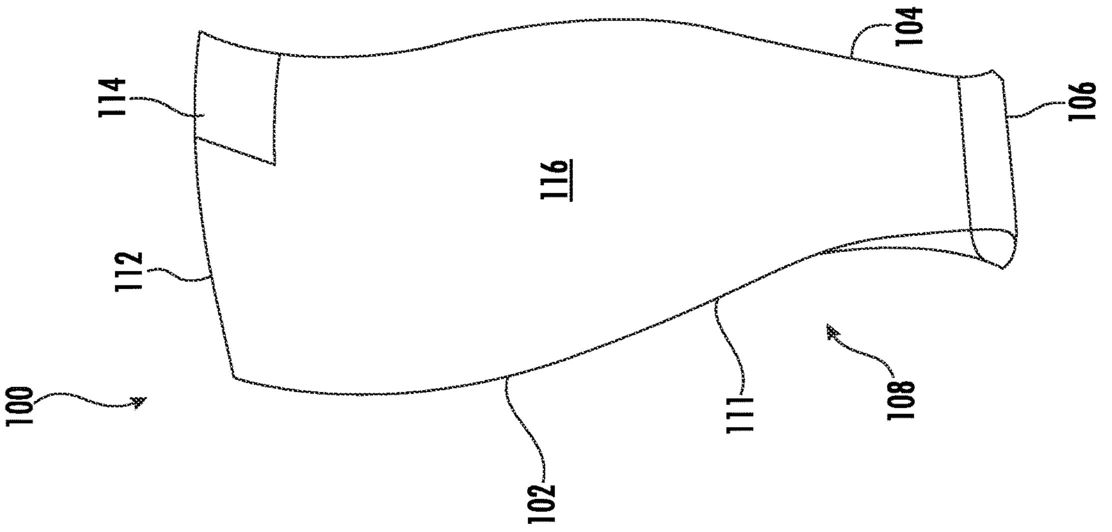
FIG. 2 is a schematic, pictorial view of an exemplary morphable rotor blade according to various embodiments of the present subject matter.

Referring now to FIGS. 2-4, pictorial views of exemplary rotor blades configured as morphable rotor blades 100 are illustrated in accordance with aspects of the present disclosure. For example, in various embodiments, the morphable rotor blades 100 of FIGS. 2-4 may be configured for use in a gas turbine engine, such as a ducted gas turbine engine, such an engine configured the same or similar to the ducted turbine engine system 10 of FIG. 1, such as a turbofan engine. In various embodiments, the morphable rotor blades 100 may be configured as fan blades for a ducted gas turbine engine. It should be appreciated that the following description is equally applicable to other suitably configured stages and associated rotor assemblies. For instance, in additional or alternative embodiments, each exemplary morphable rotor blade depicted in FIGS. 2-4 may be configured for use in an unducted gas turbine engine. As such, in various embodiments, the each of the morphable rotor blades 100 may be configured as fan blades for a ducted gas turbine engine.

It should be appreciated that the present disclosure is equally applicable to any rotor blades within a suitably configured rotor stage of a turbomachine. For example, such morphable rotor blades 100 may include, without limitation, fan blades, compressor rotor blades, turbine rotor blades, or the like. Thus, the depicted morphable rotor blades 100 may generally be utilized in any suitably configured rotor assembly for use with any suitably configured turbine engine system or turbomachine, e.g., open prop engines, turbojet engines, power generating gas turbine engines, marine engines, and the like. Further, at least one morphable rotor blade 100 may generally be configured to be included within a rotor stage of a rotor assembly of a turbomachine. Generally, the rotor assembly (e.g., such as rotor assembly 12 of FIG. 1) is powered by a rotating spool of the turbomachine, such as either of the low speed spools 45 described with reference to FIG. 1 or a similarly configured rotating spool.

More specifically, any of the depicted morphable rotor blades 100 may be configured as fan blades of a fan section of a gas turbine engine, such as the fan section of the ducted turbine engine system 10 of FIG. 1 or a similarly configured ducted gas turbine engine. Additionally, or alternatively, the illustrated morphable rotor blades 100 may be configured as rotor blades of a rotor assembly of an unducted gas turbine engine, or a similarly configured unducted gas turbine engine. Furthermore, it should be appreciated that one or more rotor blades within a stage of any suitable rotor assembly may be configured the same or similar to any of the morphable rotor blades 100 of FIGS. 2-4. For instance, all of the rotor blades within a stage of a rotor assembly may be configured the same or similar to any of the morphable rotor blades 100 of FIGS. 2-4. Additionally, or alternatively, a rotor stage of a rotor assembly may include two or more rotor blades having different suitable configurations of a morphable rotor blade 100.

Referring still generally to FIGS. 2-4, multiple morphable rotor blades 100 are illustrated in accordance with exemplary aspects of the present disclosure. Each morphable rotor blade 100 generally includes a leading edge 102 and a trailing edge 104. Leading edge 102 is at a frontmost portion of the blade as it rotates while trailing edge 104 is at a rearmost point, as will be understood by one of ordinary skill in the art. Each morphable rotor blade 100 may also include a root portion 106 and an airfoil portion 108. Root portion 106 may be configured (e.g., shaped and dimensioned) to be received in a cavity of a suitable rotor disk to allow a connection of the respective morphable rotor blade 100 to the rotor. A mid-chord region 111 may be located about midway between root portion 106 and a tip 112, as depicted for each of the illustrated embodiments.

Each of the exemplary embodiments includes a morphable portion 114, which is configured to change shape in response to a stimulus, and a non-morphable remainder of the airfoil portion (remainder portion 116). The change of the shape of morphable portion 114 relative to remainder portion 116 may allow for the airfoil shape to be adjusted at two or more operating cycle points, thereby increasing the aerodynamic efficiency of the morphable rotor blade 100 and/or an associated rotor assembly (e.g., such as a plurality of rotor blades, such as all of the rotor blades, in a stage of a rotor assembly), which in turn may lower the specific fuel consumption of the gas turbine engine. For example, morphable portion 114 may be configured to have an initial shape at a low or cruising speed and a changed shape at a higher speed. For example, in a chordwise cross-section, an initial shape may be singly curved with a relatively high curvature while the morphed shape is singly curved with a relatively low curvature.

In some embodiments, the respective morphable portions 114 may generally include one or more lattice structures formed of a morphable material, as described in more detail below with respect to FIGS. 5-10. In one embodiment, the morphable region 114 may include such a lattice structure extending an entire thickness, span, and/or chord defined by the morphable rotor blade 100 within the morphable portion 114. For example, the morphable region 114 may be formed from such a lattice structure. Additionally, or alternatively, a suitable lattice structure may be imbedded within the morphable region. In additional or alternative embodiments, a morphable region 114 according to the present disclosure may include one or more sheets including such a lattice structure. For instance, one or more such sheets may be embedded within the morphable region. Additionally, or alternatively, one or more such sheets may be positioned between plies or layers of fibers in a composite layup process. Thus, in several embodiments, it should be appreciated that such a sheet may be oriented such that a plane of the sheet is generally aligned with a span and a chord of the morphable rotor blade 100. In additional, or alternative embodiments, the morphable portion 114 may include such a sheet enveloping, coupled to, or formed with an outer surface of the airfoil portion 108 within the morphable region 114.

Referring now particularly to FIG. 2, the illustrated morphable rotor blade 100 includes a morphable portion 114 located on the trailing edge 104 of airfoil portion 108 at or near the tip 112. Additionally, or alternatively, the morphable portion 114 may extend partially or fully from the trailing edge 104 to the leading edge 102 (e.g., along a chord of the illustrated morphable rotor blade 100). For instance, the morphable portion 114 may extend along at least 10% of the chord, such as along at least 20% of the chord, such as along at least 40% of the chord, such as along at least 75% of the chord. In one or more embodiments, the morphable portion 114 may extend along a full length of the chord at the tip 112 of the airfoil portion 108. Additionally, or alternatively, the morphable portion 114 may extend partially or fully from the tip 112 to the root portion 106 (e.g., along a span of the illustrated morphable rotor blade 100). For instance, the morphable portion 114 may extend along at least 10% of the span, such as along at least 20% of the span, such as along at least 40% of the span, such as along at least 75% of the span.

Additionally, or alternatively, in order to induce a change in shape, such as from a more curved C-shape to a less curved C-shape in the trailing edge region, the morphable portion 114 may extend from the trailing edge 104 at tip 112 in the chord direction toward, but not reaching, a mid-chord region. In such an embodiment, the morphable portion 114 may extend from the tip 112 along trailing edge 104 in the span direction toward, but not reaching a mid-span region.

Referring now to FIG. 3, the illustrated morphable rotor blade 100 includes a morphable portion 114 located on the leading edge 102 of airfoil portion 108 at or near the tip 112. Additionally, or alternatively, the morphable portion 114 may extend partially or fully from the leading edge 102 to the trailing edge 104 (e.g., along a chord of the illustrated morphable rotor blade 100). For instance, the morphable portion 114 may extend along at least 10% of the chord, such as along at least 20% of the chord, such as along at least 40% of the chord, such as along at least 75% of the chord. Additionally, or alternatively, the morphable portion 114 may extend partially or fully from the tip 112 to the root portion 106 (e.g., along a span of the illustrated morphable rotor blade 100). For instance, the morphable portion 114 may extend along at least 10% of the span, such as along at least 20% of the span, such as along at least 40% of the span, such as along at least 75% of the span.

Referring now to FIG. 4, the illustrated morphable rotor blade 100 includes a morphable portion 114 located at a mid-chord region of airfoil portion 108 at or near the tip 112. Additionally, or alternatively, the morphable portion 114 may extend partially to the leading edge 102, to the trailing edge 104, or both (e.g., along a chord of the illustrated morphable rotor blade 100). For instance, the morphable portion 114 may extend along at least 10% of the chord, such as along at least 20% of the chord, such as along at least 40% of the chord, such as along at least 75% of the chord. Additionally, or alternatively, the morphable portion 114 may extend partially or fully from the tip 112 to the root portion 106 (e.g., along a span of the illustrated morphable rotor blade 100). For instance, the morphable portion 114 may extend along at least 10% of the span, such as along at least 20% of the span, such as along at least 40% of the span, such as along at least 75% of the span.

It should be understood by one of ordinary skill in the art that the morphable rotor blade 100 could include a morphable portion (e.g., morphable portion 114) at various locations, including the leading and trailing edges of the blades, at various radial locations relative to a root connectable to a rotor of a rotor assembly. In an additional, or alternative embodiment, the morphable rotor blade 100 could include a morphable portion (e.g., morphable portion 114) at various locations within the body of the rotor blade and displaced from each of the trailing edge 104, leading edge 102, and tip 112 at various radial locations and/or at a variety of positions along the chord.

Figure 5:
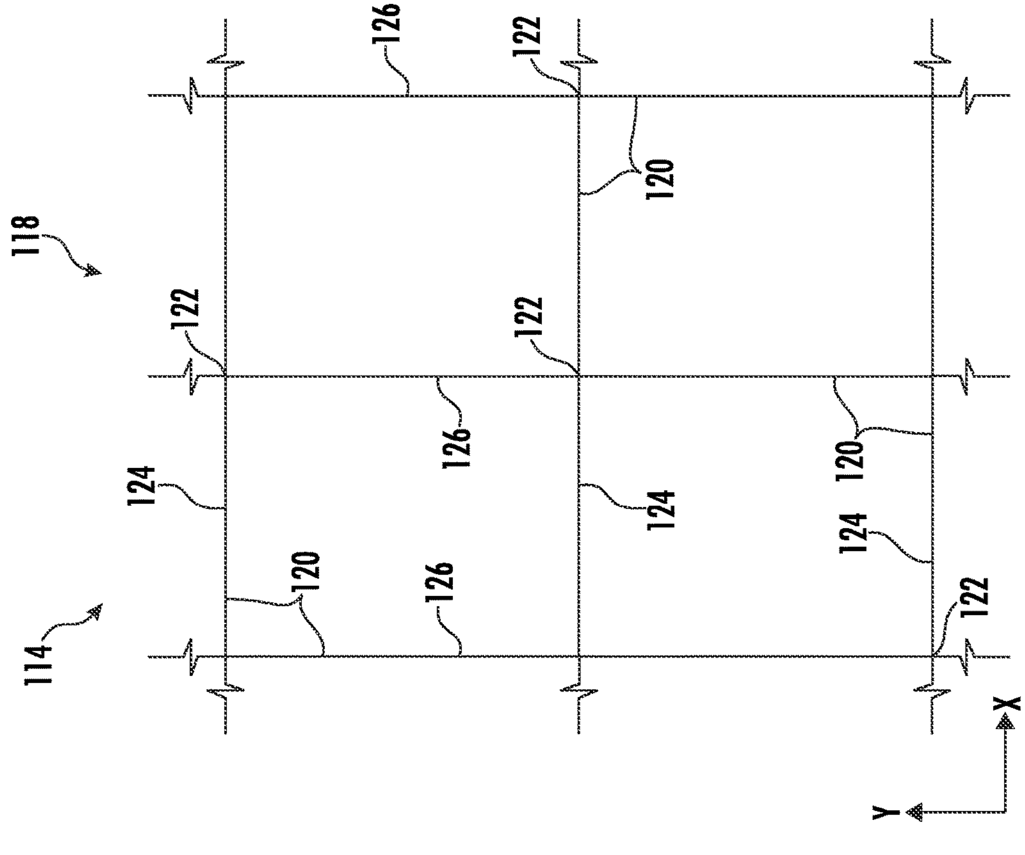
FIG. 5 is a schematic view of a segment of a lattice structure of a morphable portion in accordance with an exemplary embodiment of the present disclosure.

Referring now to FIG. 5, a schematic view of a segment of a lattice structure 118, configured as a two-dimensional lattice structure, of a morphable portion 114 is shown in accordance with an exemplary embodiment of the present disclosure. The lattice structure 118 of FIG. 5 may be configured for use with any suitably configured rotor blade including a morphable portion 114 (e.g., any of the morphable rotor blades 100 of FIGS. 2-4 or a similarly configured rotor blade). The depicted lattice structure 118 includes a number of interconnected members 120. Members 120 (such as two or more members 120) may generally be coupled or formed together at a plurality of nodes 122.

For ease of discussion, the lattice structure 118 of FIG. 5 has been defined with respect to a local x-axis and y-axis defining a plane of the exemplary two-dimensional lattice structure. In one embodiment, the x-axis and/or the y-axis may be oriented to align with an axial direction and/or radial direction of an associated rotor assembly. Additionally, or alternatively, the x-axis and/or the y-axis may be oriented to align along a chord and/or a span of an associated morphable rotor blade. However, it should be appreciated that the local x-axis, y-axis, or both may define a distinct orientation(s) with respect to such axial direction, radial direction, chord, and/or span. Furthermore, while the exemplary lattice structure 118 of FIG. 5 is configured as a grid, a person having ordinary skill in the art will appreciate that additional or alternative two-dimensional lattice structures may include members 120 defining two or more different lengths. Additionally, the members 120 may extend at various angles with respect to the y-axis and/or x-axis. Additionally, or alternatively, one or more members 120 may be curved or define one or more segments with different orientations, thicknesses, radii of curvature, or the like. For instance, the exemplary embodiment of FIG. 5 includes straight or approximately straight members 120, each of which defines the same or approximately the same length. More particularly, the depicted embodiment includes a number of first members 124 oriented to extend along the local x-axis and a number of second members 126 oriented to extend along the local y-axis. As such, a person having ordinary skill in the art will appreciate that the present disclosure is equally applicable to alternatively configured lattice structures.

In accordance with various aspects of the present disclosure, the illustrated lattice structure 118 of FIG. 5 may include a morphable material, such as a shape memory alloy (SMA) material, a piezoelectric material, or the like.

An SMA material is generally an alloy capable of returning to its original shape after being deformed. For instance, SMA materials may define a hysteresis effect where the loading path on a stress-strain graph is distinct from the unloading path on the stress-strain graph. Thus, SMA materials may provide improved hysteresis damping as compared to traditional elastic materials. Further, SMA materials may act as a lightweight, solid-state alternative to traditional actuators. For instance, certain SMA materials may be heated in order to return a deformed SMA to its pre-deformed shape. A SMA material may also provide varying stiffness, in a predetermined manner, in response to certain ranges of temperatures (i.e., temperature stimulus). The change in stiffness of the shape memory alloy is in response to a temperature stimulus related, solid state micro-structural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of a lattice structure including an SMA material intended to change stiffness during operation of the morphable rotor blade 100, the SMA material may be formed to have one operative stiffness (e.g., a first stiffness)

below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase. Whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the SMA material may define a first stiffness at a first temperature and define a second stiffness at a second temperature, wherein the second temperature is different from the first temperature. Further, in some embodiments, one of the first temperature or the second temperature is below the transition temperature and the other one may be at or above the transition temperature. Thus, in some embodiments, the first temperature may be below the transition temperature and the second temperature may be at or above the transition temperature. While in some other embodiments, the first temperature may be at or above the transition temperature and the second temperature may be below the transition temperature. Further, various of the SMA materials described herein may be configured to have different first stiffnesses and different second stiffnesses at the same first and second temperatures.

Non-limiting examples of SMA materials that may be suitable for forming the lattice structures 118 described herein may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA material may include a nickel-aluminum based alloys, copper-aluminum-nickel alloy, or alloys containing zinc, zirconium, copper, gold, platinum, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to, NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMA materials may also display superelasticity. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e., above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

A piezoelectric material may generally act as a piezoelectric actuator configured to expand or contract based on a signal defining an electrical charge. As such, members 120 of the lattice structure 118 including a piezoelectric material may generally define an actuator or spring applying a force or load to change the shape of the morphable portion 114 and/or the morphable rotor blade 100, as described herein. In various embodiments, the piezoelectric material may include, but is not limited to, a piezoelectric crystal, a piezoelectric ceramic, or a piezoelectric polymer. In various embodiments, the piezoelectric material may include, but is not limited to, langasite, gallium orthophosphate, lithium niobate, lithium tantalite, barium titanate, lead titanate, lead zirconate, lead zirconate titanate, potassium niobate, sodium tungstate, $Ba_2NaNb_5O_5$, $Pb_2KNb_5O_{15}$, zinc oxide, polyvinyfluoride, polyvinylidene fluoride, porous polypropylene, fluoroethylenepropylene, polytetrafluoroethylene, cellular cycloolefines, cellular polyethylene terephthalate, or combinations thereof.

Referring again to FIG. 5, in one embodiment, all of the members 120 may include one or more morphable materials. For example, all of the members 120 may be formed from a single morphable material, a combination of morphable materials, or members may contain different morphable materials and/or combinations of morphable materials. In additional or alternative embodiments, a portion of the members 120 may include the morphable material while a remainder of the members 120 do not include the morphable material, a different morphable material, or a different combination of morphable materials. As an example, each of first members 124 may include the morphable material, while the second members 126 do not include the morphable material, or vice-versa. In an additional or alternative embodiment, a portion or all of each of the first members 124 may include the morphable material while a portion or all of the second members 126 include the morphable material.

Figure 6:
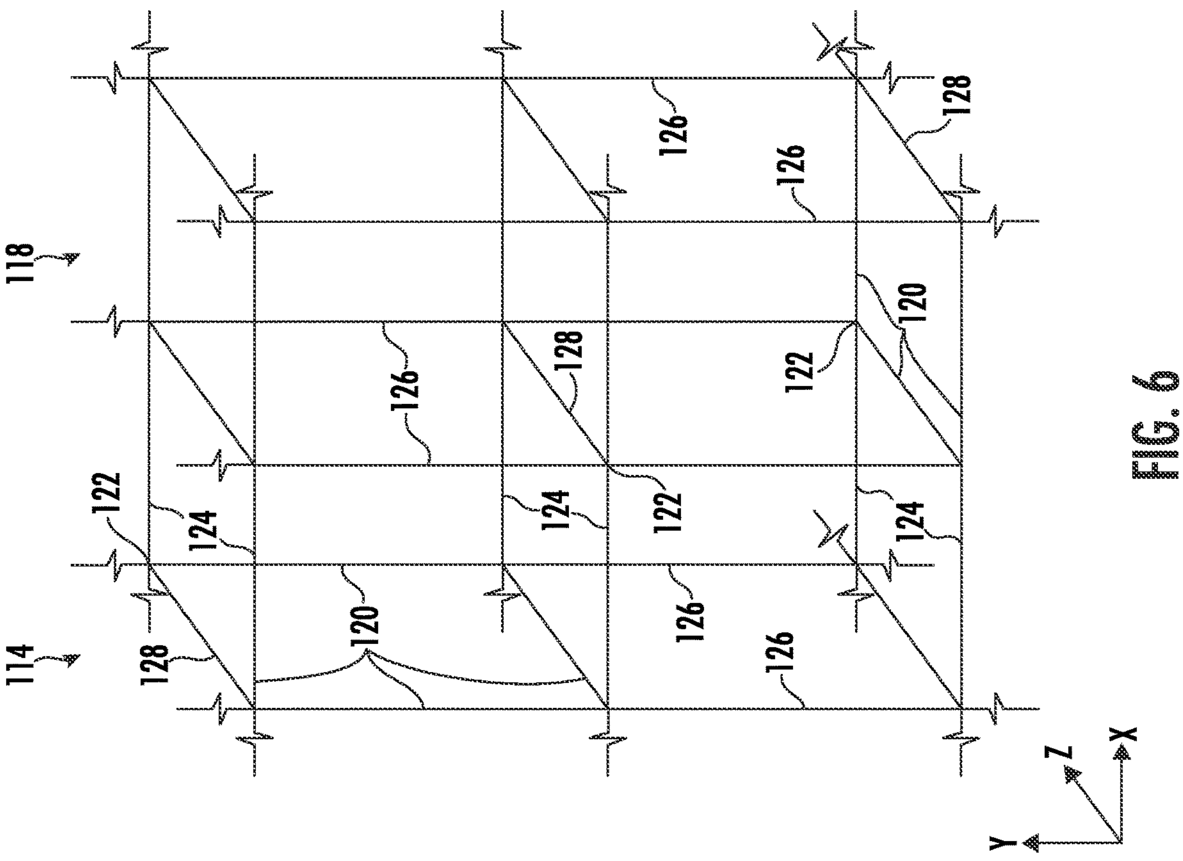
FIG. 6 is a schematic view of a segment of a lattice structure of a morphable portion in accordance with another exemplary embodiment of the present disclosure.

Referring now to FIG. 6, a schematic view of a segment of a lattice structure 118, configured as a three-dimensional lattice structure, of a morphable portion 114 is shown in accordance with an alternative or additional exemplary embodiment of the present disclosure. The lattice structure 118 of FIG. 6 may be configured generally similar to the two-dimensional lattice structure 118 of FIG. 5. For instance, the lattice structure includes members 120 (e.g., first members 124 and second members 126) interconnected at a plurality of nodes 122. However, the exemplary lattice structure 118 of FIG. 6 includes one or more third members 128 oriented to extend along a local z-axis, defined perpendicular to the local x-axis and y-axis. While the exemplary lattice structure 118 of FIG. 6 is configured as a grid, a person having ordinary skill in the art will appreciate that the present disclosure is equally applicable to additional or alternative three-dimensional lattice structures including similar or differently oriented and configured members 120.

In accordance with various aspects of the present disclosure, the illustrated lattice structure 118 of FIG. 6 may include a morphable material. In one embodiment, all of the members 120 may include the morphable material. For example, all of the members may be formed from the morphable material. In an additional or alternative embodiment, a portion of the members 120 may include the morphable material while a remainder of the members 120 do not include the morphable material, include a different morphable material, and/or include a different combination of morphable materials. As examples, only the first members 120 may include the morphable material, only the second members 126 may include the morphable material, or only the third members 128 may include the morphable material. In additional or alternative embodiments, a portion or all of the first members 120 may include the morphable material, a portion or all of the second members 126 may include the morphable material, and/or a portion or all of the third members 128 may include the morphable material.

Additionally, or alternatively, all or a portion of members 120 included within a desirable plane of the lattice structure 118 may include the morphable material. For example, all or a portion of the members 120 within a plane defined along the x-axis and the y-axis at a position along the z-axis may include the morphable material (as generally described above with respect to FIG. 5). Additionally, or alternatively, the lattice structure 118 may include multiple desirable planes of the lattice structure 118 that include members 120 with the morphable material. For example, all or a portion of the members 120 within select planes defined along the x-axis and the y-axis at select positions along the z-axis may include the morphable material (as generally described above with respect to FIG. 5).

While the embodiments of FIGS. 5 and 6 have been described and illustrated with reference to respective lattice structures 118, a person having ordinary skill in the art will appreciate that the present disclosure may be equally applicable to other suitable two-dimensional and/or three-dimensional structures. For instance, in additional or alternative embodiments, a morphable portion of a morphable turbine blade may include a two-dimensional weave of elements (e.g., fibers or toes), including a morphable material. More specifically, one or more of, such as a portion of, such as all of, the elements within such morphable portion may include or be formed from a morphable material or combination of morphable materials. In several embodiments, some or all of the elements aligned at one or more orientations may include the morphable material, similar to the various embodiments the lattice structure 118 described above with respect to FIG. 5. In additional or alternative embodiments, a morphable portion of a morphable turbine blade may include a 2.5 dimensional or three-dimensional weave of elements (e.g., fibers or toes) that includes a morphable material. More specifically, one or more, such as a portion of, such as all of, the elements within such morphable portion may include or be formed from a morphable material. In several embodiments, some or all of the elements aligned at one or more orientations may include the morphable material and/or elements within one or more desirable planes of the weave, similar to the various embodiments the lattice structure 118 described above with respect to FIG. 6.

Figure 8:
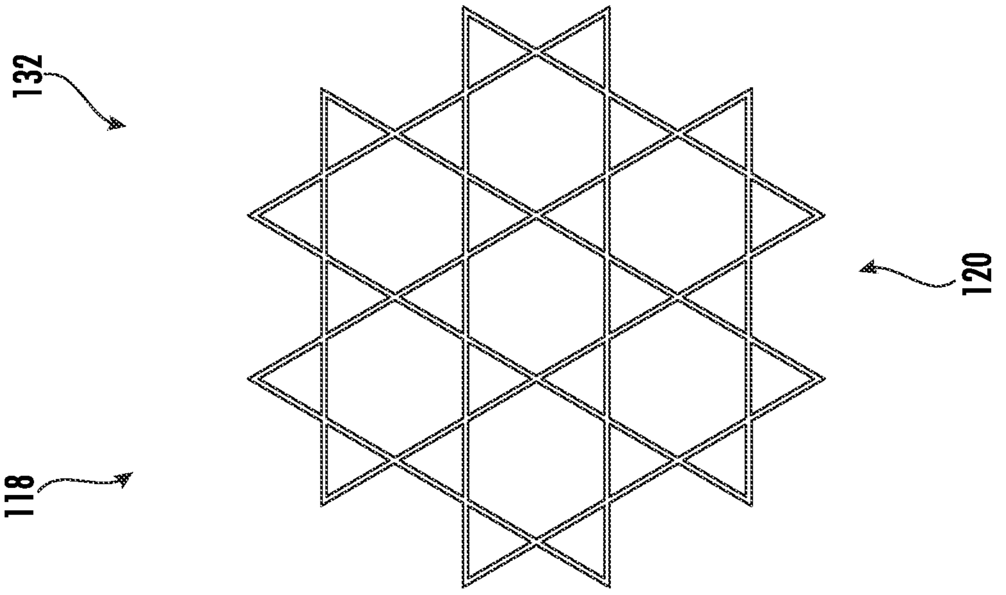
FIG. 8 is a pictorial view of the lattice structure of FIG. 8 in a different configuration in accordance with the exemplary embodiment of the present disclosure.
Figure 7:
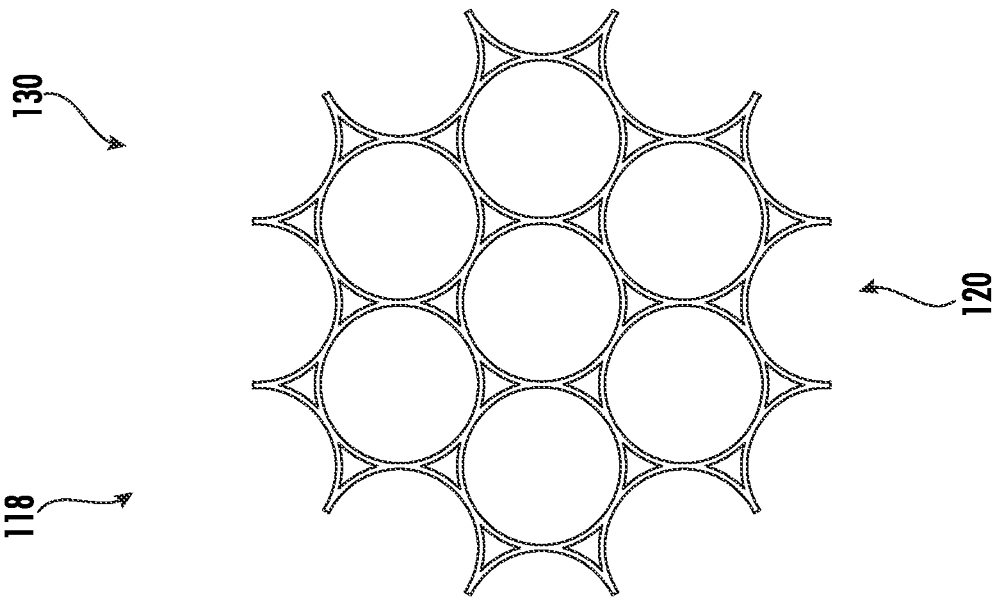
FIG. 7 is a pictorial view of a lattice structure of a morphable portion in accordance with another exemplary embodiment of the present disclosure.
Figure 10:
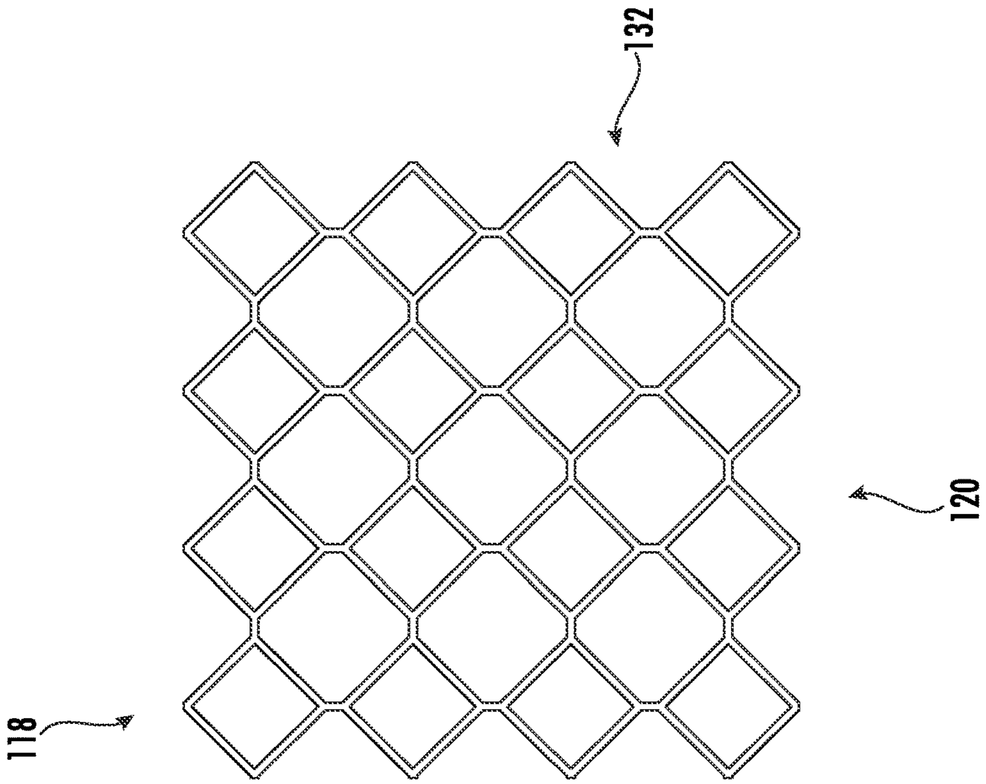
FIG. 10 is a pictorial view of the lattice structure of FIG. 10 in a different configuration in accordance with the exemplary embodiment of the present disclosure.
Figure 9:
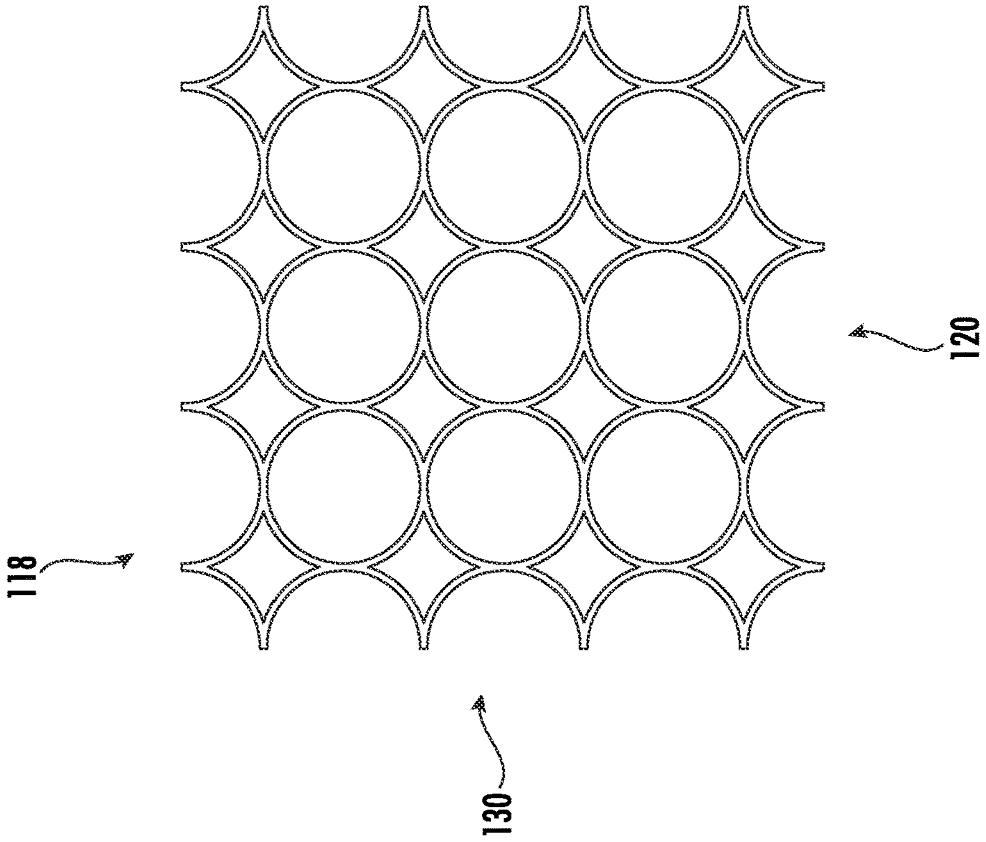
FIG. 9 is a pictorial view of a lattice structure of a morphable portion in accordance with another exemplary embodiment of the present disclosure.

Referring now to FIGS. 7-10, embodiments of exemplary lattice structures 118, each including a morphable material, are partially illustrated in accordance with aspects of the present disclosure. For example, the illustrated lattice structures 118 may be configured for use in suitably configured rotor blades including morphable portions, such as rotor blades configured the same or similar to the morphable rotor blades 100 described in reference to FIGS. 2-4. While exemplary lattice structures 118 are illustrated and described herein, a person having ordinary skill in the art will appreciate that the present disclosure is equally applicable to alternatively oriented lattice structures, such as lattice structures configured the same or similar to the lattice structures 118 described above with respect to FIGS. 5 and 6. More particularly, FIGS. 7 and 9 illustrate embodiments of respective lattice structures 118 in respective first configurations 130. FIG. 8 illustrates the embodiment of the lattice structure 118 of FIG. 7 in a second configuration 132, and FIG. 10 illustrates the embodiment of the lattice structure 118 of FIG. 9 in a second configuration 132.

Referring now particularly to FIGS. 7 and 9, the lattice structures 118 each define respective first configurations 130 (e.g., lengths of members 120, orientations of members 120, shapes of members 120, and the like). Further, at least a portion of the respective members 120 include a morphable material in the first configurations 130. Generally, the morphable material(s) of each lattice structure 118 is configured to have the first configuration 130 (e.g., initial configuration) when not subject to a particular stimulus (e.g., not subject to elevated temperature, electrical signal, certain stress/strain forces, or the like).

In certain embodiments, the stimulus may include an operating condition of an associated turbine engine system. The respective lattice structures 118 of FIGS. 7 and 9 may be configured have the illustrated first configurations 130 at respective cruise and/or conditions at first points within the respective design envelops. In several embodiments, the morphable materials of the respective lattice structures 118 may define respective first values of a material property in the first configuration 130, e.g., at the first operating condition. For instance, the material property may be a Young's modulus, a stiffness, an elasticity, or the like. In additional or alternative embodiments, the stimulus may include a first temperature of the respective morphable portion 114 and/or the morphable material. For example, the first temperature may be the temperature of the morphable portion 114 of an associated morphable rotor blade 100 at a cruise and/or at a first point within the design envelop.

Referring now particularly to FIGS. 8 and 10, the lattice structures 118 each define respective second configurations 132 (e.g., lengths of members 120, orientations of members 120, shapes of members 120, and the like). Specifically, the second configurations 132 illustrated in FIGS. 8 and 10 are different than the respective first configurations of FIGS. 7 and 9. Further, the morphable material of each lattice structure 118 is configured to change shape such as into the second configuration 132 in response to a stimulus. Generally, a morphable material may change shape in response to certain stimuli, as described in more detail above.

In certain embodiments, the stimulus may include an operating condition of an associated turbine engine system. The respective lattice structures 118 of FIGS. 8 and 10 may be configured have the illustrated second configurations 132 at take-off and/or at second points within the respective design envelops. The morphable materials of the respective lattice structures 118 generally define respective second values of the material property in the second configuration 132, e.g., at the operating condition. In several embodiments, in the operating condition, the respective morphable materials may each define at least one second value of a material property different than the first material property, e.g., a different Young's modulus, stiffness, elasticity, or the like. In additional or alternative embodiments, the stimulus may include a second temperature of the respective morphable portion 114 and/or the morphable material. For example, the second temperature may be the temperature of the morphable portion 114 of an associated morphable rotor blade 100 at a take-off and/or at a second point within the design envelop.

Figure 11:
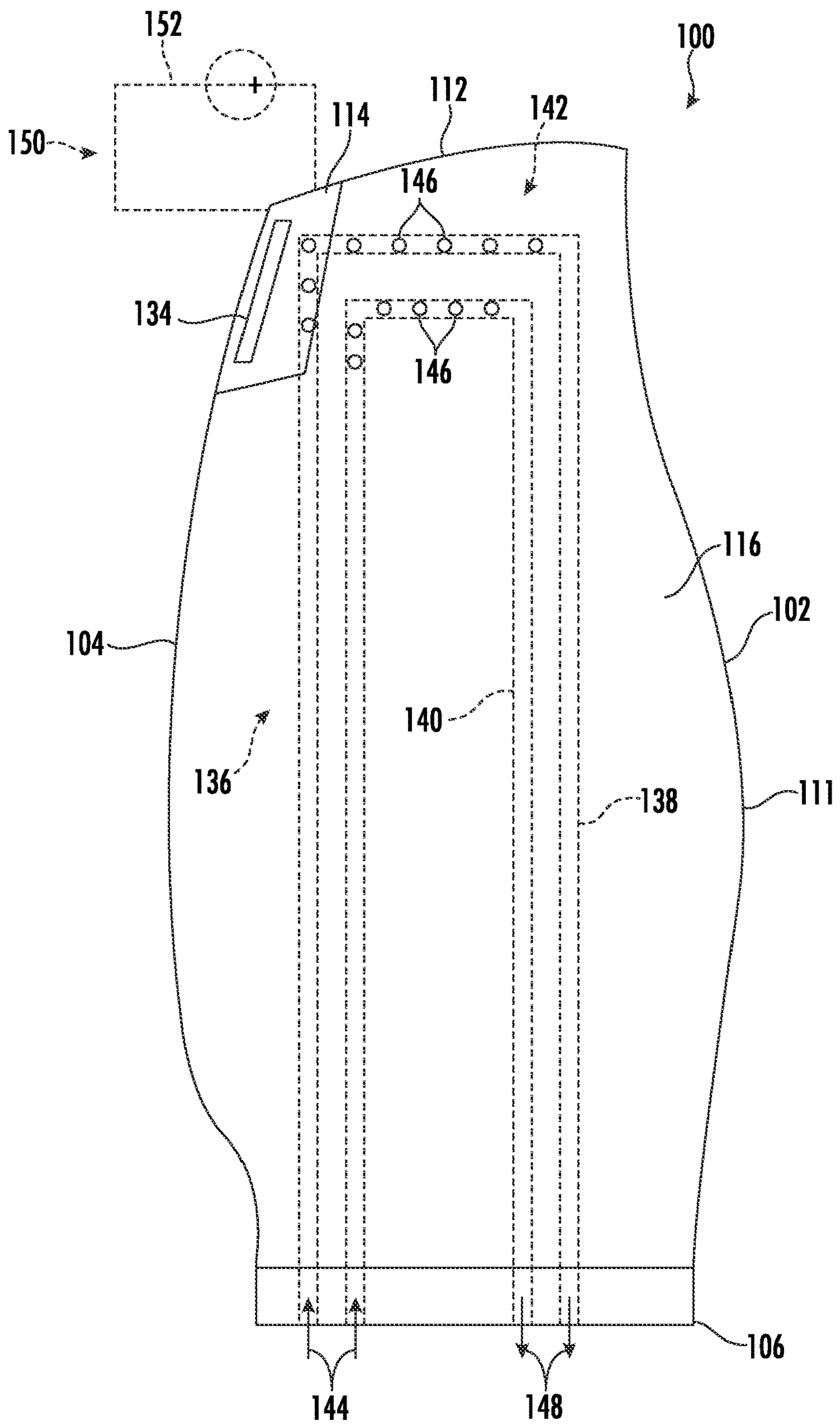
FIG. 11 is a schematic, pictorial view of a morphable rotor blade in accordance with another exemplary aspect of the present disclosure.

Referring now to FIG. 11, an additional or alternative embodiment of a morphable rotor blade 100 is illustrated in accordance with aspects of the present disclosure. Specifically, FIG. 11 illustrates an embodiment of morphable rotor blade 100 configured for active control. While the embodiment of FIG. 11 is illustrated as a morphable rotor blade 100 with a morphable portion 114 positioned along the trailing edge 104 at the tip 112, it would be understood by one of ordinary skill in the art that a morphable rotor blade 100 could include a morphable portion 114 at various locations, e.g., at the same or similar locations as described with respect to FIGS. 2-4.

In the depicted embodiment, the morphable rotor blade 100 includes a heating element 134 generally configured to change the temperature of the morphable portion 114. For instance, the heating element 134 may be configured to set a temperature of the morphable material at or move the temperature toward the first temperature, the second temperature, transition the temperature between the first temperature and the second temperature, and/or allow for temperature regulation of the morphable material at a temperature between the first and second temperatures. In the embodiment of FIG. 11, the heating element 134 is positioned within the morphable portion 114. In an additional, or alternative, embodiment, the heating element 134 may be positioned within the remainder portion 116 within close proximity of the morphable portion 114, such as within close proximity of the tip 112 and/or the trailing edge 104 of the airfoil portion 108. In several embodiments, the heating element 134 may be powered, electrically coupled to a power source, or otherwise controlled via one or more electrical lines, connections, links, or the like included in the morphable rotor blade 100, omitted for clarity.

In an additional, or alternative, embodiment, the morphable rotor blade 100 may define one or more fluid passageways 136, such as a first fluid passageway 138 and a second fluid passageway 140, forming a heat exchanger 142 (all depicted in phantom in FIG. 11). The heat exchanger 142 may generally be configured to change the temperature of the morphable portion 114. Generally, air from a section of an associated turbine engine system with higher pressure than the morphable rotor blade 100 (such as from the high speed compressor 34 and/or a later stage of such compressor) may be bled and used to raise the temperature of the morphable portion 114. Additionally, or alternatively, cooler air may be mixed with such higher pressure air and used to raise, lower, or stabilize the temperature of the morphable portion 114. Additionally, or alternatively, such higher pressure air may be cooled via an auxiliary heat exchanger and used to lower the temperature of the morphable portion 114. Additionally, or alternatively, another fluid (e.g., a lubricant, fuel, or the like) may be pumped, compressed, cooled, expanded or a combination of the proceeding and used to lower the temperature of the morphable portion 114.

The heat exchanger 142 may be configured to set a temperature of the morphable material, at or move the temperature toward, the first temperature, the second temperature, transition the temperature between the first temperature and the second temperature, and/or allow for temperature regulation of the morphable material at a temperature between the first and second temperatures. Each fluid passageway 136 includes a fluid inlet 144 for receiving an exchange fluid. Each fluid passageway includes an exhaust outlet 146, a fluid return 148, or both.

In the exemplary embodiment of FIG. 11, the morphable rotor blade 100 may define the first fluid passageway 138. More specifically, the first fluid passageway 138 is defined at least partially through the morphable portion 114. In an additional or alternative embodiment, the morphable rotor blade 100 may define the second fluid passageway 140 within the remainder portion 116 within close proximity of the morphable portion 114, such as within close proximity of the tip 112 and/or the trailing edge 104 of the airfoil portion 108.

In an additional, or alternative, embodiment, the morphable portion 114 may be configured to change in shape based on an electrical signal communicated to the morphable material of the morphable portion 114. As shown schematically and in phantom in FIG. 11, a turbine engine system associated with the morphable rotor blade 100 may include a power source 150 electrically coupled to the morphable portion 114, such as to the morphable material of the morphable portion 114. In several embodiments, the morphable material may receive electrical signals via one or more electrical lines, connections, links, or the like (phantom lines 152) included in the morphable rotor blade 100, illustrated schematically. For example, the stimulus and/or operating condition may include a first electrical signal, such as a first current communicated from the power source 150. Additionally, or alternatively, the stimulus and/or operating condition may include a second electrical signal, such as a second current communicated from the power source 150.

In an additional, or alternative embodiment, the morphable portion 114 may be configured to change in shape based on the speed the blade is moving during operation and thus the surface pressure applied by its immediate environment (e.g., gases in the area of rotor assembly 12) and centrifugal forces in response to the rotation. For example, the stimulus and/or operating condition may include a first rotational speed of an associated turbine engine system, such as rotational speed of the morphable portion of an associated morphable rotor blade at a cruise and/or first point within the design envelop. Additionally, or alternatively, the stimulus and/or operating condition may include a second rotational speed of an associated turbine engine system, such as rotational speed of the morphable portion of an associated morphable rotor blade at a takeoff and/or a second point within the design envelop.

Figure 12:
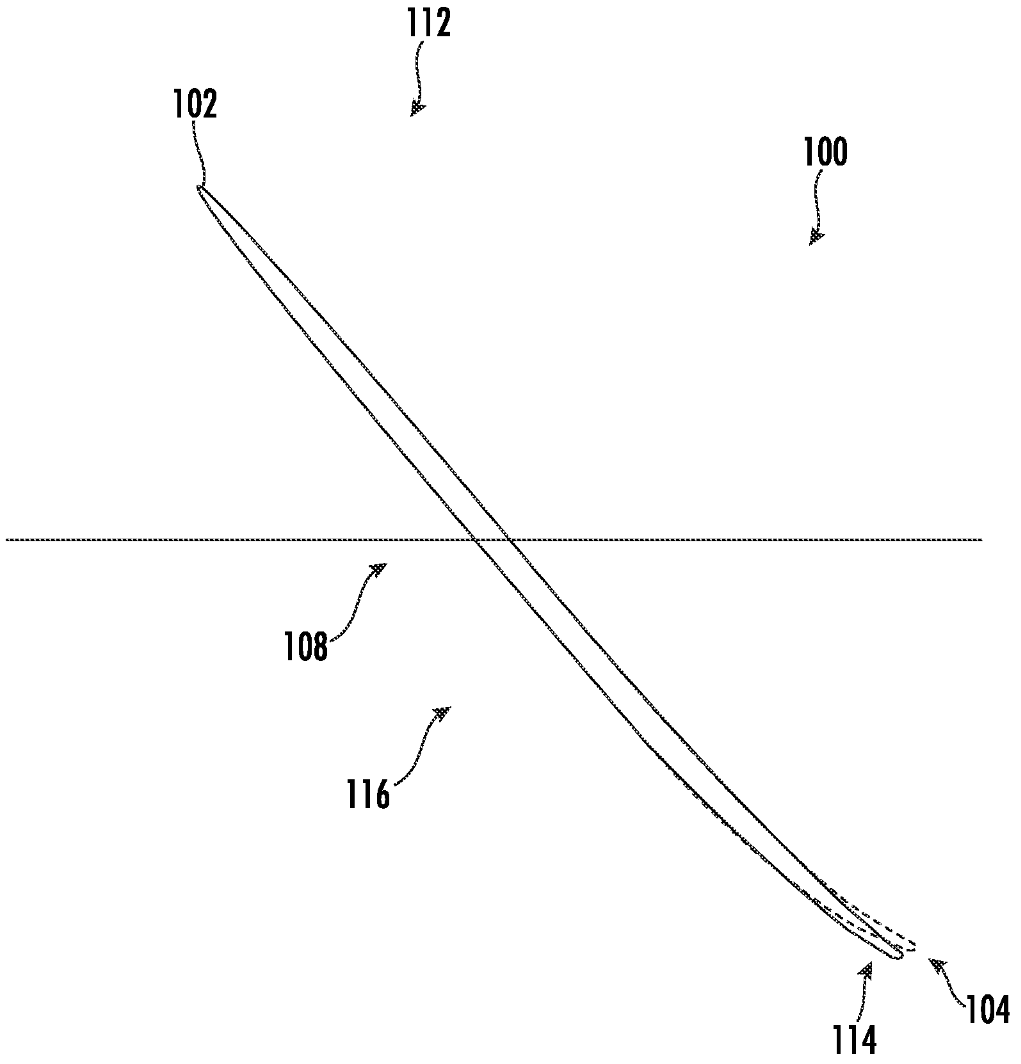
FIG. 12 is a schematic, pictorial view of a morphable rotor blade in accordance with another exemplary aspect of the present disclosure, particularly illustrating a change in shape of the morphable rotor blade at a respective tip.

FIG. 12 depicts one example of a change in shape of morphable portion 114 of a morphable rotor blade 100 at a tip 112 in accordance with an exemplary aspect of the present disclosure. Specifically, the dotted line shows a first shape while the solid line shows a second shape thereof in response to a change in the stimulus and/or a change from a first configuration to a second configuration of a morphable material within a lattice structure included within morphable portion 114, e.g., a similar change as described with reference to FIGS. 7-10 and the respective first configurations 130 and second configurations 132.

Figure 13:
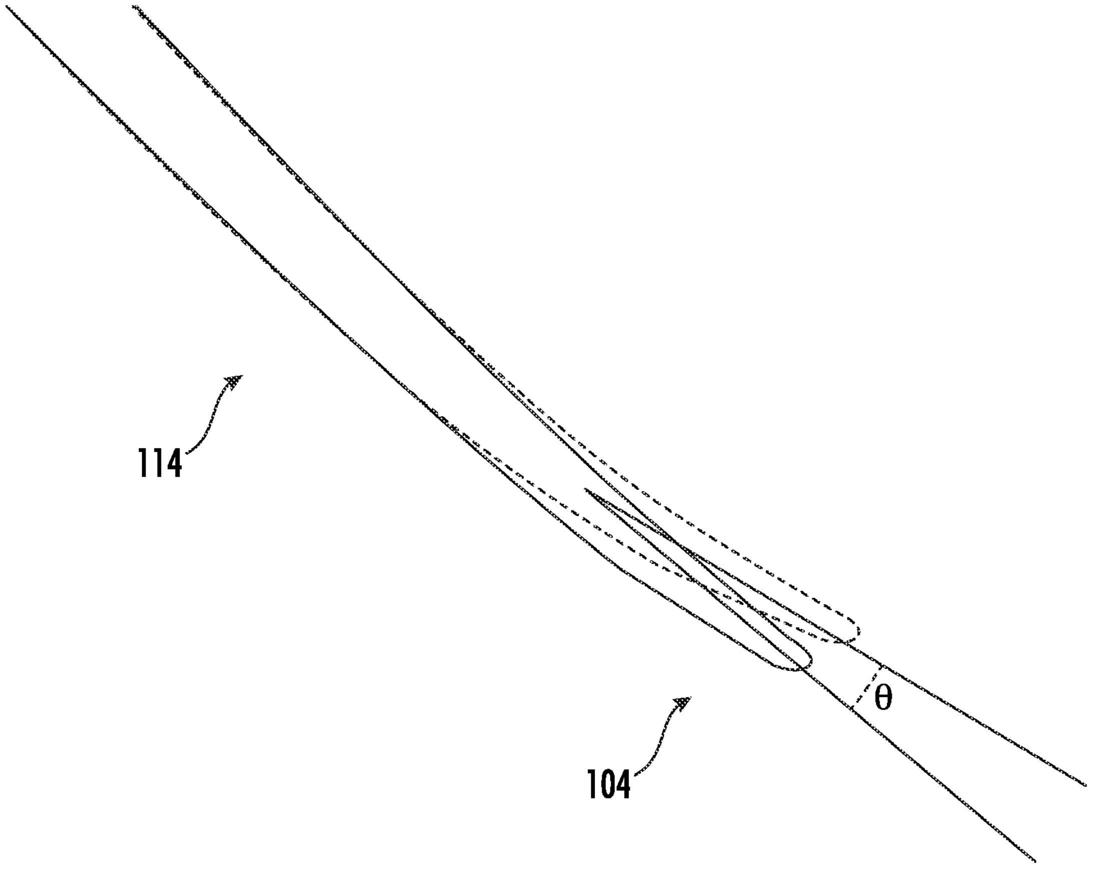
FIG. 13 is a view of the trailing edge of the morphable rotor blade of FIG. 13, in accordance with an exemplary aspect of the present disclosure.

FIG. 13 is a close-up view of the trailing edge 104 of the morphable rotor blade 100 in FIG. 12, which shows a change in shape of the morphable portion 114 according to a camber angle θ. For example, in some embodiments the camber angle θ of a trailing edge 104 changes when the morphable material changes shape. In such embodiments, the camber angle θ may change by from about 2 degrees to about 15 degrees. In some embodiments, the camber angle θ may change by about 10 degrees. For example, for an aircraft using the turbine engine system using the morphable rotor blades disclosed herein, a lower camber angle may provide more climb benefit while a higher camber angle may provide more cursing benefit. The change in camber angle may be produced via one or more stimulus conditions that occurs at the respective operating conditions.

Additionally, or alternatively, the ratio of the surface area and/or volume of morphable portion 114 and remainder portion 116 may also be controlled to provide a desired performance of morphable rotor blade 100 in response to a stimulus change, as described herein.

The initial shape of an airfoil (e.g., airfoil portion 108) prior to changing shape may be configured, or even optimized, such that the bending loads (or moments) are favorable to induce morphing of a rotor blade 16 (e.g., a fan blade). For example, a configuration of a lattice structure including a morphable material as described herein may be optimized such that in-plane load from centrifugal forces in response to blade rotation and the induced bending moments drive the initial airfoil shape of airfoil portion and/or morphable portion 114 to change. In a chordwise cross-section, an initial shape of an airfoil portion 108 may be singly curved with a relatively high curvature while the morphed shape is singly curved with a relatively low curvature.

Figure 14:
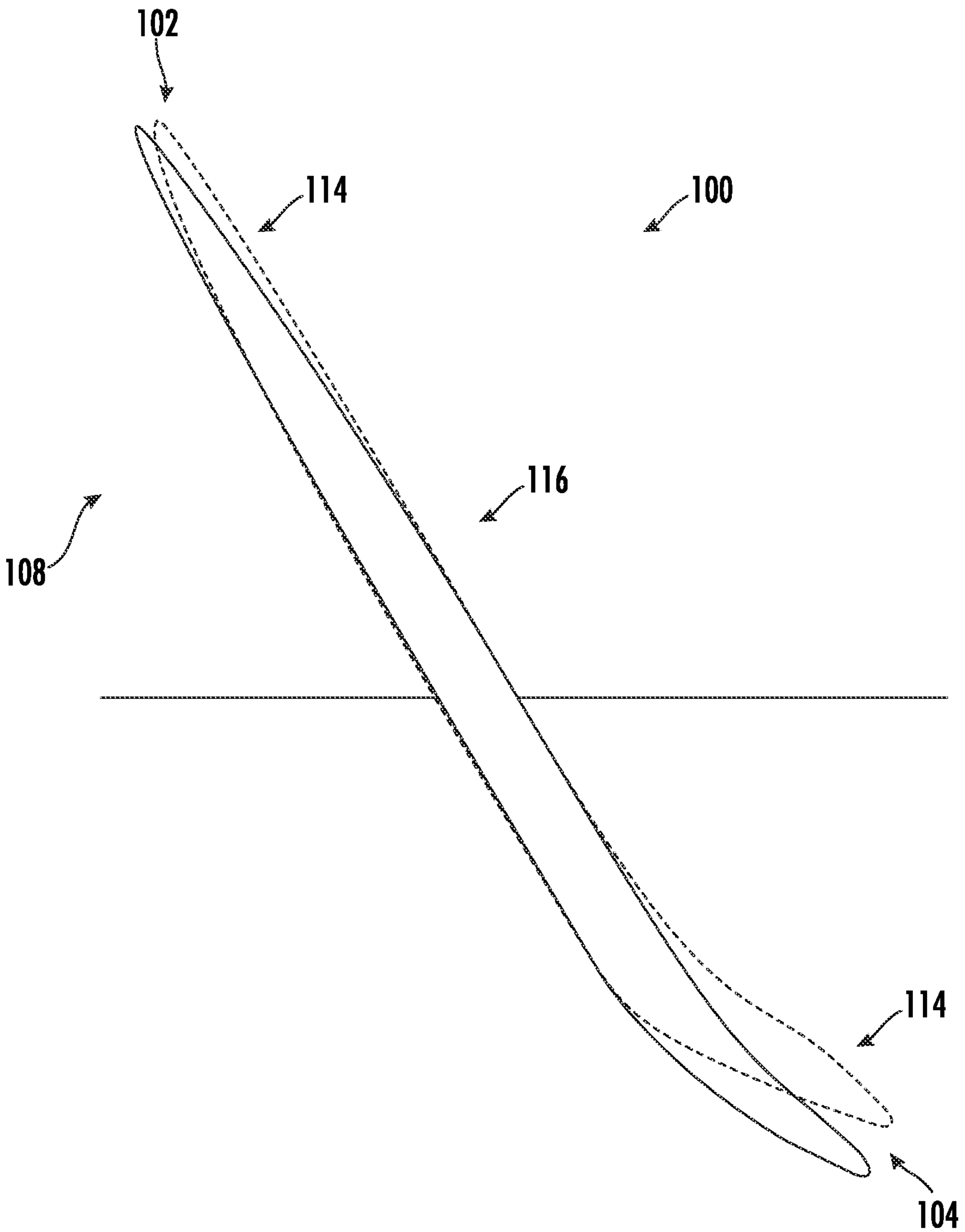
FIG. 14 is a schematic, pictorial view of a morphable rotor blade in accordance with another exemplary aspect of the present disclosure, particularly illustrating changes in shape of two morphable portions at a respective tip of the blade.

Further, as described, in various embodiments herein, a morphable rotor blade may change shape from a more curved C-shape to a less curved C-shape in response to a stimulus. The shape change occurs in the trailing edge region of the blade or in both the leading and trailing edge regions of the blade and generally not at the mid-chord region of the blade. For instance, referring now to FIG. 14, a top view is illustrated of an exemplary additional or alternative embodiment of a morphable rotor blade 100 in accordance with aspects of the present subject matter. As illustrated, the morphable rotor blade 100 may include morphable portions 114 (e.g., a lattice structure including a morphable material as described herein) at both the leading edge 102 and the trailing edge 104.

In various embodiments, the morphable rotor blade 100, the root portion 106, the morphable portion 114, and/or the remainder portion 116 may include at least one of a metallic material (e.g., metal or metal alloy), a polymer material, and/or a composite material. In additional or alternative embodiments, each of the morphable rotor blades 100 of FIGS. 2-4 may be configured as a composite rotor blade such that at least the remainder portion 116 substantially comprises one or more composite materials. In one or more embodiments, a suitable morphable rotor blade 100 may be constructed as a solid body, with hollow internal cavity, or with a filled internal cavity (such as filled with a low density material). Additionally, or alternatively, each morphable rotor blade 100 may be formed at least partially from a ceramic matrix composite. More particularly, in certain embodiments, the respective remainder portions 116 and/or the morphable portions 114 may be formed from one or more ceramic matrix composite prepreg plies. In an additional or alternative embodiments, the respective remainder portions 116 and/or the morphable portions 114 may be formed at least partially from a ceramic matrix composite woven structure (e.g., a 2D, 3D, or 2.5D woven structure). Composite materials may include, but are not limited to, metal matrix composites (MMCs), polymer matrix composites (PMCs), or ceramic matrix composites (CMCs). Composite materials, such as may be utilized in the exemplary morphable rotor blades 100, generally include a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, in various embodiments, PMC materials may be fabricated by impregnating a fabric or unidirectional tape with a resin (prepreg), followed by curing. For example, multiple layers of prepreg may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., a pressure side or a suction side). The PMC material is placed inside of a bag and a vacuum is utilized to hold the PMC material against the die during curing. In still other embodiments, the respective morphable rotor blades 100 may be at least partially formed via resin transfer molding (RTM), light resin transfer molding (LRTM), vacuum assisted resin transfer molding (VARTM), a forming process (e.g., thermoforming), or similar.

Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short, chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In several embodiments, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled in response to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In additional or alternative embodiments, each of the morphable rotor blades 100 of FIGS. 2-4 may be configured as a composite rotor blade such that at least the remainder portion 116 substantially comprises one or more metallic materials, such as but not limited to, steel, titanium, aluminum, nickel, or alloys thereof. For example, in some embodiments, the morphable rotor blade may substantially comprise an aluminum material with one or more titanium additions such as a titanium edge guard. In one or more embodiments, a suitable morphable rotor blade 100, including embodiments where the morphable rotor blade 100 comprises one or more metallic materials, may be constructed as a solid body, with hollow internal cavity, or with a filled internal cavity (such as filled with a low density material). Moreover, in some embodiments, the morphable rotor blade 100 may comprise a remainder portion that comprises multiple materials, may comprise a remainder portion that is substantially monolithic, or may comprise any other material combination or configuration suitable for a rotor blade application. For instance, in certain embodiments, the remainder portion 116 may be cast.

In various embodiments, the respective remainder portions 116 and/or the morphable portions 114 may be made at least partially from a polymer (such as a thermoplastic or a thermoset). Though, it should be recognized that the respective remainder portions 116 and/or the morphable portions 114 may be formed from multiple materials, such as a combination of morphable materials, metals, metal alloys, polymers, and/or composites. Further, the respective root portions 106 may include any of these materials or components of these materials.

In additional, or alternative embodiments, the respective remainder portions 116 and/or the morphable portions 114 may include an additive structure. More specifically, in various embodiments, the respective morphable portions 114 and associated features and structures described herein may be formed via additive manufacturing, such as a 3D printing process. The use of such a process may allow the morphable rotor blade 100 to be formed integrally, as a single monolithic component, or as any suitable number of sub-components. For example, at least one of the morphable portion 114 or the remainder portion 116 may be formed using an additive-manufacturing process. In particular, at least one lattice structure 118 including a morphable material may be formed in the respective morphable portions 114 via an additive-manufacturing process. Forming the respective lattice structures including a morphable material via additive manufacturing may allow lattice structures to be integrally formed and include a variety of features not possible when using prior manufacturing methods. For example, the additive manufacturing methods described herein enable the manufacture of morphable portions 114 and/or lattice structures 118 including one or more morphable materials having any suitable size and shape with one or more configurations, some of these novel features are described herein.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be a morphable material as described herein, a plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as “additive materials.”

In addition, one skilled in the art will appreciate that a variety of materials and methods for bonding those materials may be used and are contemplated as within the scope of the present disclosure. As used herein, references to “fusing” may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the respective morphable rotor blade 100, the airfoil portion 108, the morphable portion 114, the remainder portion 116, lattice structures 118 including morphable materials, and/or internal passageways, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then “built-up” slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the exemplary morphable rotor blades 100, described herein. For example, such components may include thin additively manufactured layers and unique internal structures, such as lattice structures, e.g., lattice structures formed from a morphable material. In addition, the additive manufacturing process enables the manufacture of a single component having different materials such that different portions of the component may exhibit different performance characteristics. The successive, additive nature of the manufacturing process enables the construction of these novel features. As a result, various morphable rotor blades 100 described herein may exhibit improved performance and reliability.

This written description uses examples to describe various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A morphable rotor blade for a turbine engine system comprising a root portion; and an airfoil portion comprising a morphable portion comprising a morphable material that changes shape in response to a stimulus.

The morphable rotor blade of any clause herein, wherein the morphable material comprises a shape memory alloy.

The morphable rotor blade of any clause herein, wherein the morphable material comprises a piezoelectric material.

The morphable rotor blade of any clause herein, wherein the stimulus comprises a temperature stimulus.

The morphable rotor blade of any clause herein, further comprising a heating element configured to change a temperature of the morphable portion.

The morphable rotor blade of any clause herein, wherein the morphable rotor blade comprises a fluid passageway positioned within the morphable rotor blade such that a fluid flowing through the fluid passageway can change a temperature of the morphable portion.

The morphable rotor blade of any clause herein, wherein the fluid passageway extends through the root portion.

The morphable rotor blade of any clause herein, wherein the stimulus comprises an electrical signal.

The morphable rotor blade of any clause herein, wherein at least a portion of a trailing edge comprises the morphable portion.

The morphable rotor blade of any clause herein, wherein the morphable portion comprises a lattice structure comprising the morphable material, and wherein the lattice structure changes shape in response to the stimulus.

The morphable rotor blade of any clause herein, wherein a camber angle of a trailing edge changes when the morphable material changes shape.

The morphable rotor blade of any clause herein, wherein the camber angle changes by about 2 degrees to about 15 degrees.

The morphable rotor blade of any clause herein, wherein the morphable rotor blade comprises a composite material.

The morphable rotor blade of any clause herein, wherein the morphable rotor blade is a fan blade.

A turbine engine system includes a compressor section, a combustion section, and a turbine section, a shaft extending axially through the compressor section, the combustion section, and the turbine section, and a rotor assembly comprising a plurality of rotor blades, at least one of the plurality of rotor blades including a root portion and an airfoil portion comprising a morphable portion comprising a morphable material that changes shape in response to a stimulus.

The turbine engine system of any clause herein, wherein the stimulus comprises a rotational speed of the rotor assembly.

The turbine engine system of any clause herein, wherein the at least one of the plurality of rotor blades comprises a fluid passageway positioned within the at least one of the plurality of rotor blades such that a fluid flowing through the fluid passageway can change a temperature of the morphable portion.

The turbine engine system of any clause herein, wherein the fluid passageway extends through the root portion and is fluidly connected with the compressor section.

The turbine engine system of any clause herein, wherein the stimulus comprises an electrical signal.

The turbine engine system of any clause herein, wherein the turbine engine system comprises a power source configured to produce the electrical signal.

What is claimed is:

1. A morphable rotor blade for a turbine engine system comprising:

a root portion; and an airfoil portion extending from the root portion to a tip of the morphable rotor blade, the tip being the farthest edge in a spanwise direction from the root portion, the airfoil portion comprising a morphable portion disposed at the tip, the morphable portion comprising a morphable material that changes shape to change a shape of the airfoil portion in response to a temperature stimulus, and a remainder portion that is free of the morphable material;

wherein the morphable portion comprises a lattice structure comprising a plurality of members of the morphable material connected at a plurality of nodes, and wherein the lattice structure changes shape in response to the temperature stimulus, wherein the remainder portion extends from the root portion to the tip.

2. The morphable rotor blade of claim 1, wherein the morphable material comprises a shape memory alloy.

3. The morphable rotor blade of claim 1, wherein the morphable material comprises a piezoelectric material.

4. The morphable rotor blade of claim 1, further comprising a heater configured to change a temperature of the morphable portion.

5. The morphable rotor blade of claim 1, wherein the morphable rotor blade comprises a fluid passageway positioned within the morphable rotor blade such that a fluid flowing through the fluid passageway can change a temperature of the morphable portion.

6. The morphable rotor blade of claim 5, wherein the fluid passageway extends through the root portion.

7. The morphable rotor blade of claim 1, wherein at least a portion of a trailing edge comprises the morphable portion.

8. The morphable rotor blade of claim 1, wherein a camber angle of a trailing edge changes when the morphable material changes shape.

9. The morphable rotor blade of claim 8, wherein the camber angle changes by about 2 degrees to about 15 degrees.

10. The morphable rotor blade of claim 1, wherein the morphable rotor blade comprises a composite material.

11. The morphable rotor blade of claim 1, wherein the morphable rotor blade is a fan blade.

12. The morphable rotor blade of claim 1, wherein the lattice structure is defined as a plurality of repeating non-rectangular shapes.

13. A turbine engine system, comprising:

a compressor section, a combustion section, and a turbine section, a shaft extending axially through the compressor section, the combustion section, and the turbine section, and a rotor assembly comprising a plurality of rotor blades, at least one of the plurality of rotor blades comprising:

a root portion; and an airfoil portion extending from the root portion to a tip of the morphable rotor blade, the tip being the farthest edge in a spanwise direction from the root portion, the airfoil portion comprising a morphable portion disposed at the tip, the morphable portion comprising a morphable material that changes shape to change a shape of the airfoil portion in response to a temperature stimulus, and a remainder portion that is free of the morphable material, wherein the morphable portion comprises a lattice structure comprising a plurality of members of the morphable material connected at a plurality of nodes, and wherein the lattice structure changes shape in response to the temperature stimulus, wherein the remainder portion extends from the root portion to the tip.

14. The turbine engine system of claim 13, wherein the at least one of the plurality of rotor blades comprises a fluid passageway positioned within the at least one of the plurality of rotor blades such that a fluid flowing through the fluid passageway can change a temperature of the morphable portion.

15. The turbine engine system of claim 14, wherein the fluid passageway extends through the root portion and is fluidly connected with the compressor section.

16. A morphable rotor blade for a turbine engine system comprising:

a root portion; and an airfoil portion extending from the root portion to a tip of the morphable rotor blade, the tip being the farthest edge in a spanwise direction from the root portion, the airfoil portion comprising a morphable portion disposed at the tip, the morphable portion comprising a morphable material that changes shape in response to a stimulus, and a remainder portion that is free of the morphable material, wherein the morphable material comprises a shape memory alloy or a piezoelectric material, and wherein the stimulus is a rotation speed of the morphable rotor blade, wherein the morphable portion comprises a lattice structure comprising a plurality of members of the morphable material connected at a plurality of nodes, and wherein the lattice structure changes shape in response to the stimulus, wherein the remainder portion extends from the root portion to the tip.

17. The morphable rotor blade of claim 16, wherein the morphable material further changes shape in response to a second stimulus, the second stimulus being an electrical signal.

* * * * *